United States Patent [19]
Fukuyama

[11] Patent Number: 5,161,672
[45] Date of Patent: Nov. 10, 1992

[54] DRIVE ROLLER IN CONVEYOR
[75] Inventor: Hiroshi Fukuyama, Tokyo, Japan
[73] Assignee: Bridgestone Corporation, Tokyo, Japan
[21] Appl. No.: 864,389
[22] Filed: Apr. 6, 1992

Related U.S. Application Data
[63] Continuation of Ser. No. 727,011, Jul. 8, 1991, abandoned.

[30] Foreign Application Priority Data
Jul. 6, 1990 [JP] Japan .................. 2-178933
[51] Int. Cl.⁵ .............................. B65G 35/00
[52] U.S. Cl. .................. 198/722; 198/781; 198/782; 414/529
[58] Field of Search ........... 198/722, 781, 782; 193/35 SS, 35 F, 37; 244/137.1; 414/529, 535

[56] References Cited
U.S. PATENT DOCUMENTS
1,743,223 1/1930 Lowy .................. 193/37
3,613,852 10/1971 Schwarzbeck .......... 198/782
3,899,070 8/1975 Lang .................. 198/782
4,783,108 11/1988 Fukuyama et al. .

Primary Examiner—Joseph E. Valenza
Attorney, Agent, or Firm—Jordan and Hamburg

[57] ABSTRACT

A drive roller for use in a conveyor, comprising rotary shafts supported in respective bearings, the respective rotary shafts being provided at the respective ends of a core member and one of the rotary shafts being connected to a drive source. The core member is a hollow- or solid-cylindrical one and has provided thereon and fastened at the respective end portions thereof a tubular inflatable member having at least one inner cord layer in which the cords are laid with a predetermined angle, one end of which inflatable member is fastened to one end portion of the core member while the other end of the inflatable member is folded back inwardly and fastened to the other end portion of the core member, thus a sealed space being defined between the inflatable member and the outer surface of the core member. A fluid passage is formed in the core member to supply and discharge the fluid to and from the sealed space to inflate and deflate the inflatable member, the inflatable member when inflated having a cylindrical outer surface. A to-be-conveyed object is supported and driven only on the outer surface of the inflatable member when inflated.

2 Claims, 4 Drawing Sheets

DRIVE ROLLER IN CONVEYOR

This application is a continuation of application Ser. No. 07/727,011, filed Jul. 8, 1991 now abandoned.

BACKGROUND OF THE INVENTION

1. Field of the Invention:

The present invention relates to a drive roller for use in a conveyor to move containers, part-storing wooden boxes or the like in a factory, storehouse, etc..

2. Description of the Prior Art:

FIG. 1 shows a well-known typical roller conveyor having rollers 100 each having a motor provided therein and which are driven and stopped by turning on and off the power supply thereto through a power line 101. The reference A in FIG. 1 indicates an object to be conveyed and 102 indicates a conveyor frame.

FIGS. 2 and 3 show another conventional roller conveyor having a frame 102 on which free rollers 103 are mounted each having a clutch mechanism 104 provided under it. The clutch mechanism 104 comprises a rotary shaft 105 on which a sprocket 106 and urethane roller 107 are fixed and which is rotatably supported at both end portions thereof in bearings 108 one of which has a lifting diaphragm 109 provided under it. The diaphragm 109 is provided with an air supply/exhaust port 110 to which an air pipe 111 is connected. The other bearing 108 is so supported in a rubber bush 112 that vertical movement of the corresponding end portion of the rotary shaft 105 can be accommodated.

A chain 113 extending around the sprocket 106 and a sprocket 115 of a motor 114 is provided. In this conventional roller conveyor, the motor 114 is put into operation to rotate the rotary shaft 105 while the diaphragm 109 is supplied with air to lift the urethane roller 107 and thus put it into contact with the free roller 103 which in turn will be rotated, thereby to move the object A.

In the conventional roller conveyor shown in FIG. 1, the drive roller has a complicated structure which leads to a high manufacturing cost. Further, since the motor is provided inside, the roller has a large outside diameter and is not suitably used in applications which need a high torque. Also, it is difficult for the same reason to design the roller structure as an explosion-proof one.

Since the clutch mechanism is provided for the roller in the conventional roller conveyor shown in FIGS. 2 and 3, the manufacturing cost is high and the height of the entire system is inevitably large, the latter resulting in excessive use of space. Also, because of the contact between the urethane roller and free roller, large torque cannot be assured. Also, it is difficult to install and maintain the roller conveyor.

SUMMARY OF THE INVENTION

The present invention has an object to overcome the above-mentioned drawbacks of the conventional constructions by providing a drive roller which is simplified in structure, can assure a large torque, can be manufactured with a low cost, is easy to install and maintain and can be easily designed to have an explosion-proof structure.

The above object can be attained by providing a drive roller for use in a conveyor, comprising, according to the present invention, a rigid hollow- or solid-cylindrical core member having two opposite end portions; a tubular inflatable member having at least one inner cord layer in which the cords are laid with a predetermined angle, one end of the inflatable member being fastened to the core member at one of the end portions of the core member, while the other end of the inflatable member is folded back inwardly and fastened to the core member at the other end portion of the core member, the inflatable member and the outer surface of the core member thus defining a sealed space between them and the inflatable members when inflated having a cylindrical outer surface; a fluid passage formed in the core member, through which a fluid is supplied and discharged to and from inside the sealed space to inflate and deflate the inflatable member; rotary shafts provided at the respective ends of the core member and supported in respective bearings, one of which shafts is to be connected to a drive source; only the cylindrical outer surface of the inflatable member when inflated supporting and driving a to-be-conveyed object.

The present assignee has already filed more than one patent application for apparatuses for catching an object in which inflatable tubes similar to the one used in the present invention are used. For instance, the tube disclosed in U.S. Pat. No. 4,783,108 is one inflatable outwardly when supplied with a fluid.

The tubular inflatable member used in the present invention serves as a drive roller when inflated.

When supplied with a fluid such as air, the inflatable member of the drive roller according to the present invention contacts and supports the to-be-conveyed object. Since the inflated member is in surface contact, not merely line contact, with the object because it receives the weight of the object, a large torque can be assured when driving the object. With such an arrangement, when the fluid is discharged from inside the inflated thus deflated member, the outer surface of the member does not contact the object and, the conveyor is thus stopped in this simple manner.

Since the drive roller according to the present invention has the above-mentioned construction, its structure is simple and it can be maintained easily. Also, a conveyor built using the drive rollers according to the present invention needs a reduced space for the entire conveyor system and can easily be designed to have an explosion-proof structure.

DETAILED DESCRIPTION OF THE PREFERRED EMBODIMENT

These and other objects and advantages of the present invention will be better understood from the ensuing description made, by way of example, of the preferred embodiment of the present invention with reference to the drawings.

Figure 1:
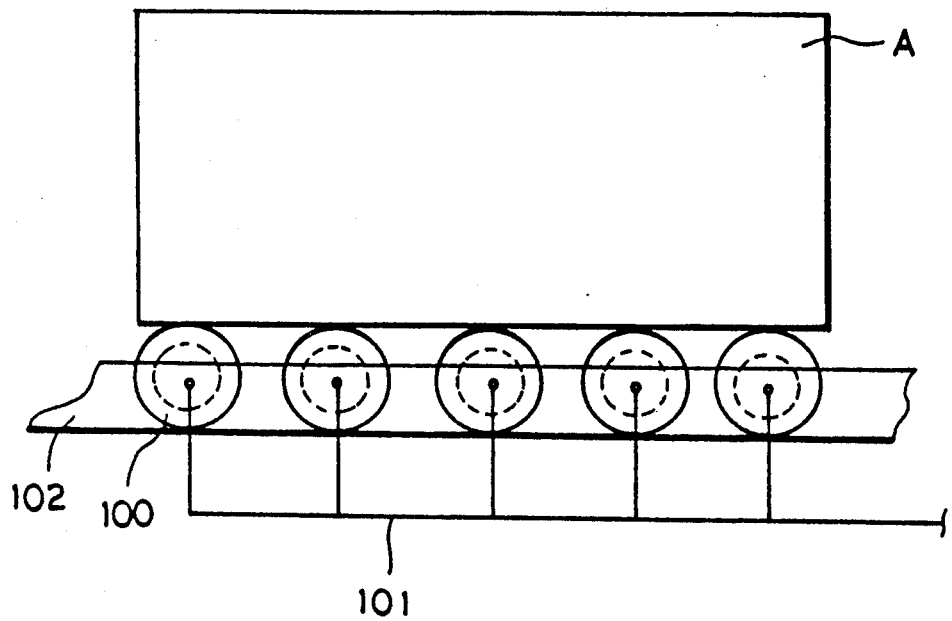
FIG. 1 is a schematic drawing of a conventional roller conveyor.
Figure 2:
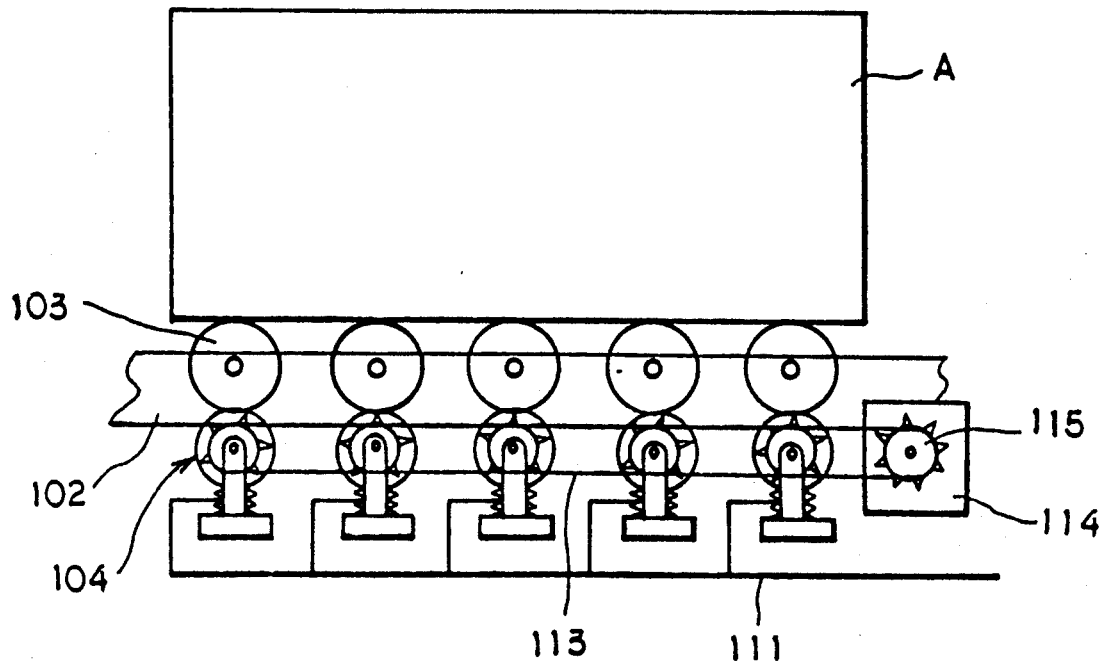
FIG. 2 is a schematic drawing of another roller conveyor.
Figure 3:
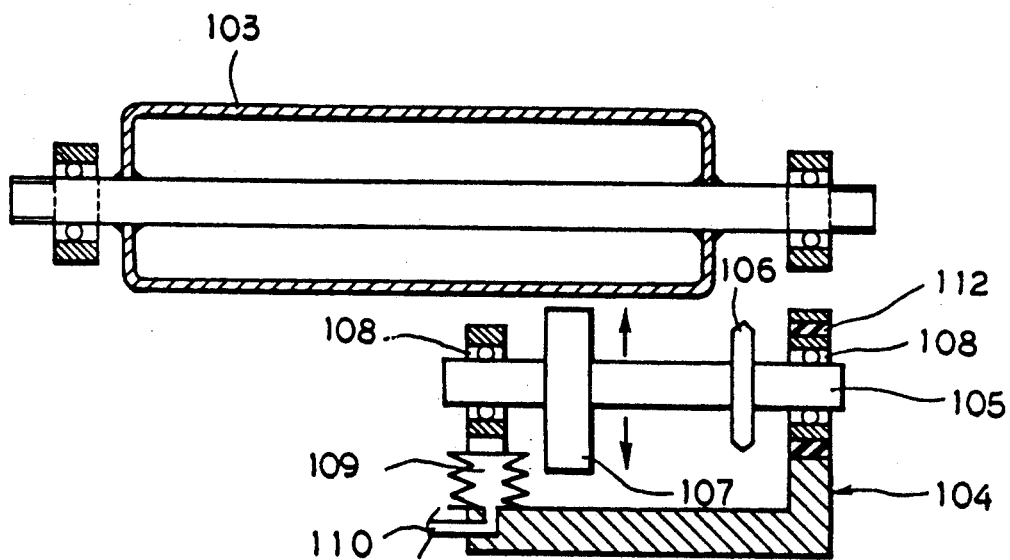
FIG. 3 is a sectional view of the clutch mechanism shown in FIG. 2.
Figure 4:
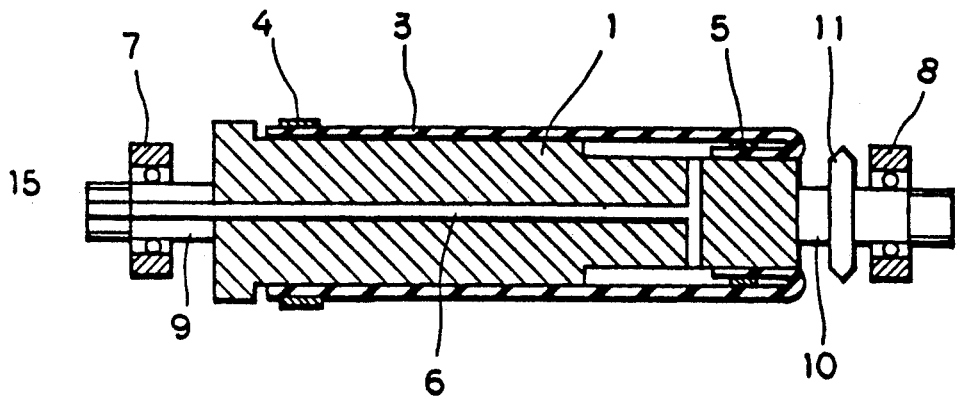
FIG. 4 is a sectional view of a preferred embodiment of the drive roller according to the present invention.
Figure 5:
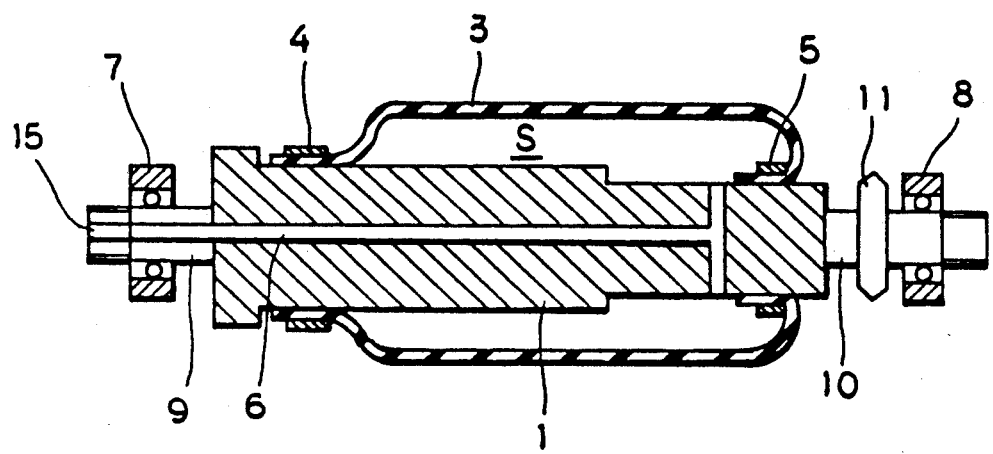
FIG. 5 is a sectional view showing the drive roller of FIG. 4 in a state where the inflatable member is inflated by having been supplied with a fluid.
Figure 6:
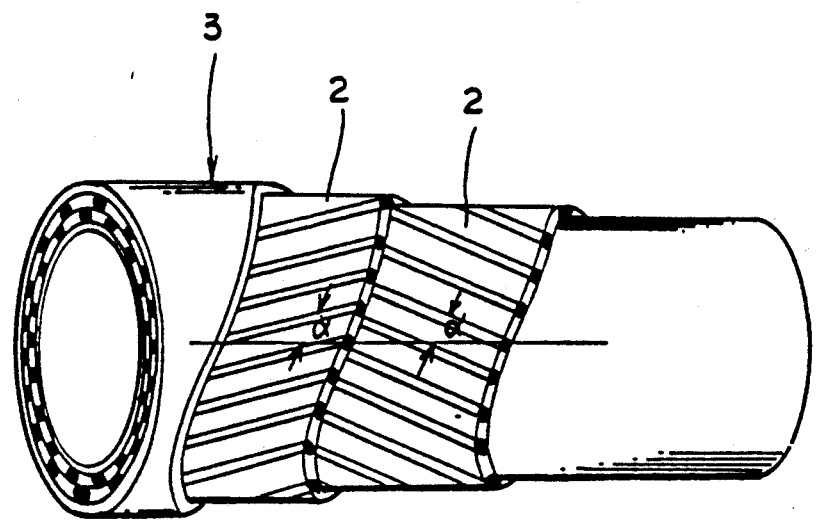
FIG. 6 is a partially fragmentary view of the inflatable member.

In the embodiment shown in FIG. 4, a rigid solid-cylindrical core member 1 has fixed at both end portions thereof the opposite ends of a tubular inflatable member 3 having two inner cord layers 2 in which the cords are laid with a predetermined angle (see FIG. 6). The ends of the inflatable member 3 are fastened to the core member 1 by means of calking rings 4 and 5. One end of the inflatable member 3 put on the core member 1 is fastened to the core member 1 by the calking member 5, and the other end is folded back inwardly and fastened to the core member 1 by the calking member 4. A space S is defined and sealed between the inflatable member 3 and core member 1 (see FIG. 5), and the core member 1 has formed therein a fluid passage 6. The fluid passage 6 is in communication with the space S for supply/discharge of the fluid. The solid-cylindrical core member 1 has formed integrally therewith and at both ends thereof, respectively, rotary shafts 9 and 10 which are supported in bearings 7 and 8, respectively. The rotary shaft 10 has a sprocket 11 secured thereto. A chain 14 is provided extending around the sprocket 11 and sprocket 13 of a motor 12 (see FIG. 7) to transmit the drive force of the sprocket 13 of the motor 12 to the drive roller.

The inflatable member 3 having the two inner cord layers 2 is a rubber tube open at both ends thereof. The cords of the cord layers 2 may preferably be made of an organic fiber selected among nylon, polyester and the like. The inflatable member 3 may preferably be made of a rubber such as chloroprene or the like. The core body 1 is formed as a solid-cylindrical one in the illustrated embodiment, but it may be formed as a hollow-cylindrical one. It is made of a metallic or synthetic material. A fluid supply/discharge port 15 is formed in the rotary shaft 9.

A fluid such as air supplied from the supply/discharge port 15 into the drive roller thus constructed is charged into the space S through the fluid passage 6 to inflate the inflatable member 3 as shown in FIG. 5. When the motor 12 is put into operation with the inflatable member 3 thus inflated and the drive force is transmitted from the sprocket 13 to the sprocket 11 by means of the chain 14, the drive roller is rotated. Thus, the to-be-conveyed object A is supported, and moved, only on the outer circumferential surface of the inflated member 3.

As shown in FIG. 6, the inflatable member 3 has the two inner cord layers 2. In case the member 3 has a single inner cord layer 2, the cord angle α may be 0 deg. while in case two such cord layers 2 are provided, the cord angle α should be on the order of 15 to 50 deg. . The fold-back of one end of the inflatable member 3 should be so appropriately set that when the member 3 is inflated by being supplied with the fluid, the outer circumferential surface thereof is as truly cylindrical as possible. Of course, the shape of the outer circumferential surface of the inflatable member 3 when inflated varies depending upon the number of the cord layers 2 in the member 3 as well as upon the cord angle α. Therefore, the shape of the outer circumferential surface of the inflatable member 3 when inflated is predetermined based on the number of the cord layers 2, cord angle α and the fold-back of the inflatable member 3 at one end thereof.

Figure 7:
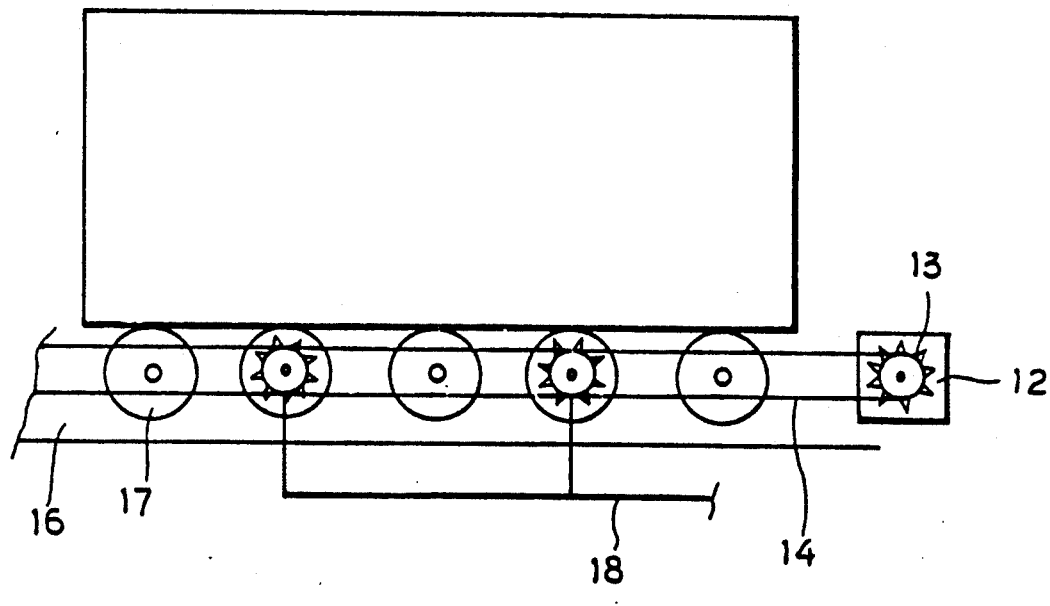
FIG. 7 is a schematic view showing a conveyor using the drive rollers according to the present invention.

FIG. 7 shows a roller conveyor using the drive roller shown in FIGS. 4 to 6, in which a frame 16 has mounted alternately thereon free rollers 17 and the drive rollers according to the present invention in such a manner that the surface of the member 3 when inflated is higher than the top of the free roller 17. A fluid supply/discharge pipe 18 is connected to the supply/discharge port 15 provided in the rotary shaft 9 of the drive roller. In the state shown in FIG. 7, a fluid such as air is supplied to inside the inflatable member 3 to inflate the latter, the to-be-conveyed object A is supported on the outer circumferential surface of the member 3 thus inflated, and the drive rollers are rotationally driven by the motor 12 to convey the object A. When the fluid is discharged from inside the inflated member 3, the member 3 is deflated and the object A is supported on the free rollers 17.

Figure 8:
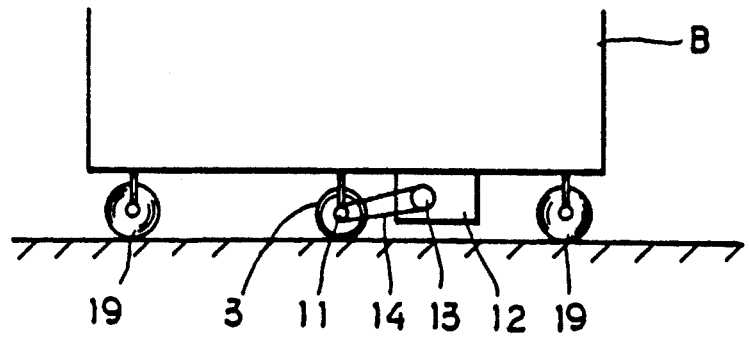
FIG. 8 is a schematic view showing an example of application of the drive roller according to the present invention in moving a cart.

In a kind of conveyor shown in FIG. 8, a cart B corresponding to the above-mentioned to-be-conveyed object A is provided with tires 19 and a motor 12 is installed under the bottom of the cart B. The drive force of the motor 12 is transmitted to a sprocket 12 by means of a chain 14. When the inflatable member 3 of the drive roller is inflated with the motor 12 turned on, the member 3 rotates and contacts the floor or ground surface, thereby driving the cart B.

What is claimed is:

1. A drive roller for use in a conveyor, comprising:
    a rigid hollow-or solid-cylindrical core member having two opposite end portions;
    a tubular inflatable member, one end of the inflatable member being fastened to said core member at one of the end portions of said core member while the other end of the inflatable member is folded back inwardly and fastened to said core member at the other end portion of said core member, said inflatable member and the outer surface of said core member thus defining a sealed space between them and the inflatable member when inflated having an outer surface;
    a fluid passage formed in said core member, through which a fluid is supplied and discharged to and from inside said sealed space to inflate and deflate the inflatable member;
    rotary shafts provided at the respective ends of said core member and supported in respective bearings, one of which shafts is to be connected to a drive source; and
    only the outer surface of said inflatable member when inflated supporting and driving a to-be-conveyed object.

2. A drive roller according to claim 1, wherein the inflatable member has at least one inner cord layer in which the cords are laid with a predetermined angle.

* * * * *